(12) United States Patent
Miyashita et al.

(10) Patent No.: US 6,296,320 B1
(45) Date of Patent: Oct. 2, 2001

(54) MULTI-PIECE RIM TYPE DISK WHEEL AND A METHOD FOR PRODUCING THE SAME

(75) Inventors: Satoru Miyashita, Ebina; Mitsuru Itoh; Ichiro Takeuchi, both of Ayase, all of (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/343,469

(22) Filed: Jun. 30, 1999

(30) Foreign Application Priority Data

Aug. 7, 1998 (JP) .................................. 10-224781
Mar. 2, 1999 (JP) .................................. 11-053466

(51) Int. Cl.[7] .................................................. B60B 21/00
(52) U.S. Cl. .................................................. 301/97
(58) Field of Search ........................... 301/10.1, 23, 95, 301/96, 97, 98, 9.1, 11.1, 29.2, 63.1; 152/409, 410, DIG. 10; 29/894.35, 351

(56) References Cited

U.S. PATENT DOCUMENTS

| Re. 33,046 | * | 9/1989 | Suckow ................................. 152/410 |
|---|---|---|---|
| 3,372,957 | * | 3/1968 | Taylor ................................. 301/11.1 |
| 3,783,927 | * | 1/1974 | Verdier ................................. 152/409 |
| 3,882,919 | * | 5/1975 | Sons, Jr. et al. ....................... 301/410 |
| 4,530,387 | * | 7/1985 | Osawa ................................. 152/410 |
| 4,574,859 | * | 3/1986 | Smith ................................. 152/410 |
| 5,380,071 | * | 1/1995 | Kier, jr. ................................. 301/10.1 |
| 5,795,034 | * | 8/1998 | Sayer ................................. 301/11.1 |
| 5,938,291 | * | 8/1999 | Pankhurst et al. ................... 301/10.1 |
| 5,984,421 | * | 11/1999 | Proctor ................................. 301/23 |
| 6,027,176 | * | 2/2000 | Kuhl et al. .......................... 301/11.1 |

* cited by examiner

*Primary Examiner*—S. Joseph Morano
*Assistant Examiner*—Long Bao Nguyen
(74) *Attorney, Agent, or Firm*—Pillsbury Winthrop LLP

(57) ABSTRACT

A multi-piece rim type disk wheel includes a multi-piece rim and a disk. The multi-piece rim includes a rim base, a bead seat band, a lock ring and a flange. The disk includes an outside portion constituting a part of the rim base, and a hub coupling portion extending radially inwardly from the outside portion and has a substantially T-shaped cross-section. A method of producing the multi-piece rim type disk wheel includes the steps of: manufacturing a gutter band, a first center band, a disk having a substantially T-shaped cross-section, a second center band and a back flange separately from each other; and connecting them to each other by a full penetration butt weld to form into the integral rim base.

5 Claims, 5 Drawing Sheets

MULTI-PIECE RIM TYPE DISK WHEEL AND A METHOD FOR PRODUCING THE SAME

This application is based on Japanese Patent Applications HEI 10-224781 filed on Aug. 7, 1998 and HEI 11-53466 filed on Mar. 2, 1999, the content of which is incorporated into the present application by reference.

BACKGROUND OF THE INVENTION

1. Field of the Invention

The present invention relates to a large, or an extra large multi-piece rim type disk wheel mounted to off-road vehicles, for example, construction vehicles, and a method for producing the same.

2. Description of Related Art

As illustrated in FIG. 6, the conventional multi-piece rim type disk wheel includes a rim base 1, a bead seat band 2, a lock ring 3, and a flange 4. In order to make the manufacture of a large-sized rim easy. The rim base 1 is usually divided into a gutter band 1a located at one end of the rim base 1, a back flange 1d located at another end of the rim base 1, and center bands 1b and 1c located between the gutter band 1a and the back flange 1d. The gutter band 1a, the back flange 1d, and the center bands 1b and 1c are manufactured separately and then welded to each other into the rim base 1.

Then, an outside portion 8a of a disk 8 having a T-shaped cross-section is fit to an inside surface of the center band 1c located in the center of the rim base, and the center band 1c and the outside portion 8a of the disk 8 are connected by a fillet weld.

When a construction vehicle needs to handle an increased movable load, which requires an increase in an axle shaft strength and a hub strength, outside diameters of the axle shaft and the hub need to be increased in order to meet the increased demand on the construction vehicle.

However, if the outside diameter of the hub of a conventional structure of a multi-piece rim type disk wheel were increased, the conventional multi-piece rim type disk wheel would interfere with a wheel coupling portion 9a of a hub 9 and a break drum 98b, as shown by a broken line in FIG. 2 (in which the conventional multi-piece rim type disk wheel is shown by the broken line and the structure of the present invention is shown by a solid line), so that it would be impossible to meet the needs of an increased movable load.

SUMMARY OF THE INVENTION

An object of the present invention is to provide a multi-piece rim type disk wheel and a method for producing the same which can accommodate an increase in a movable load of an off-road vehicle.

The object of the present invention is achieved by a multi-piece rim type disk wheel and a method for producing the same in accordance with the present invention. The multi-piece rim type disk wheel includes a multi-piece rim and a disk. The multi-piece rim includes a rim base, a bead seat band, a lock ring and a flange which are formed separately from each other. The disk includes an outside portion constituting a part of the rim base and a hub coupling portion extending radially inwardly from the outside portion. The disk has a substantially T-shaped cross-section.

The rim base includes a gutter band, a first center band, the disk, a second center band and a back flange constructed separately from each other. The gutter band, the first center band, the disk, the second center band and the back flange are arranged in that order in an axial direction of the rim base, and are connected to each other by a weld.

The outside portion of the disk has two opposite ends. One end of the two opposite ends of the outside portion is connected to the first center band by a full penetration butt weld, and another end of the two opposite ends of the outside portion is connected to the second center band by a full penetration butt weld.

The outside portion of the disk includes a first center band side portion located closer to the first center band than an axial center of the hub coupling portion. An outside surface of the first center band side portion is inclined radially inwardly toward the first center band.

The method of producing a multi-piece rim type disk wheel of the present invention includes the steps of: manufacturing a disk, which includes an outside portion constituting a part of a rim base and a hub coupling portion extending radially inwardly from the outside portion, and has a substantially T-shaped cross-section, and manufacturing a gutter band, a first center band, a second center band and a back flange, separately from each other; arranging the gutter band, the first center band, the disk of the substantially T-shaped cross-section. the second center band and the back flange in that order in an axial direction of the rim base, and connecting them with each other by a full penetration butt weld to construct the rim base; and assembling the rim base integrally formed with the disk, the bead seat band, the lock ring and the flange, which are separate from each other, into a multi-piece rim type disk wheel.

In the above multi-piece rim type disk wheel, since a part of the rim base is constructed by the outside portion of the disk, a relatively large space is provided inside the multi-piece rim type disk wheel, which allows an outside diameters of a hub and an axle shaft to be increased. As a result, it becomes possible to carry an increased movable load, and to reduce the weight of the multi-piece rim type disk wheel.

In the above multi-piece rim type disk wheel in a case where the first and the second center bands, the gutter band and the back flange are separately manufactured and then connected to each other by a full penetration butt weld into the rim base, reliability of the strength of the rim base is improved.

In the above multi-piece rim type disk wheel, in a case where the outside surface of the first center band side portion located closer to the first center band than the axial center of the hub coupling portion is inclined radially inwardly toward the gutter band, the transition of the cross-sectional configurations among members constituting the rim base is smooth, which makes mounting and demounting of a tire easy.

In the above production method of the multi-piece rim type disk wheel, since the disk, the gutter band, the first center band, the second center band and the back flange are separately manufactured and then are connected integrally with each other by a full penetration butt weld into the integral rim base, production of the rim base becomes easy as compared with a case where a rim base is manufactured by rolling and then bending. Further, with a multi-piece rim type disk wheel produced according to the method of the present invention, the same advantages as those in the above-described multi-piece rim type disk wheel are obtained.

DETAILED DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

Figure 1:
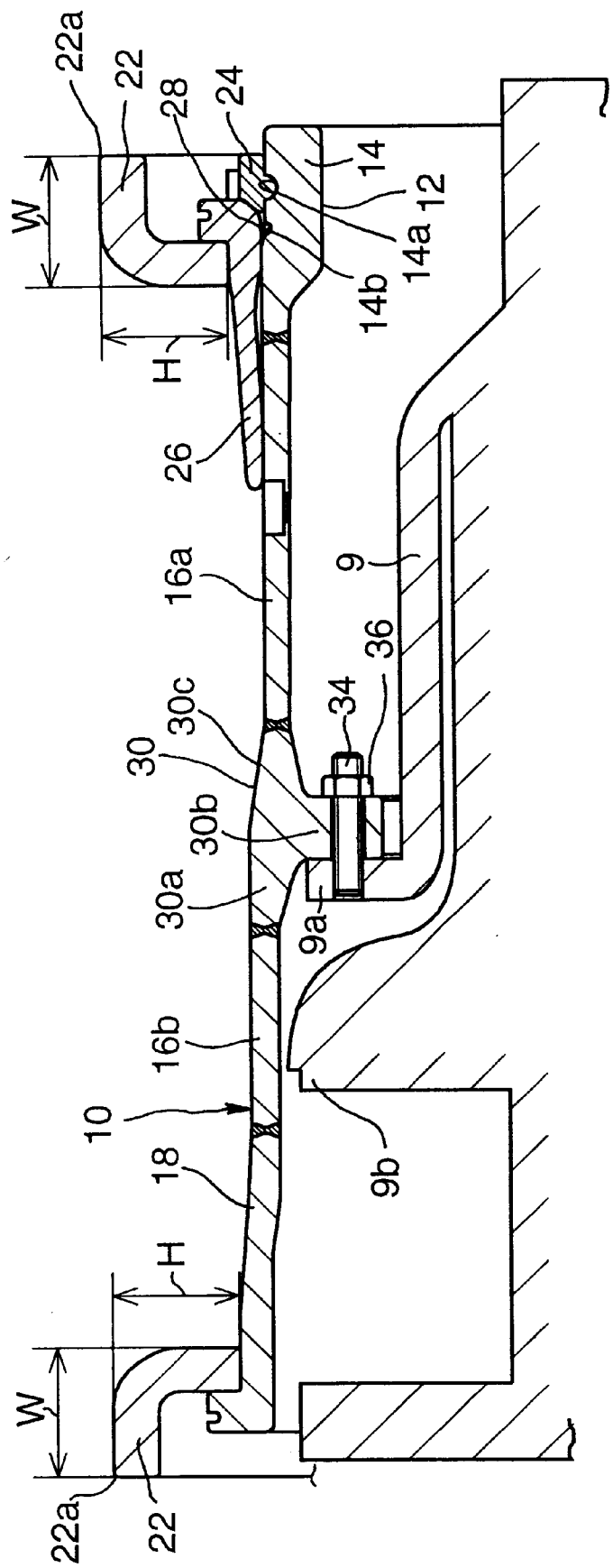
FIG. 1 is a cross-sectional view of a multi-piece rim type disk wheel according to an embodiment of the present invention.
Figure 2:
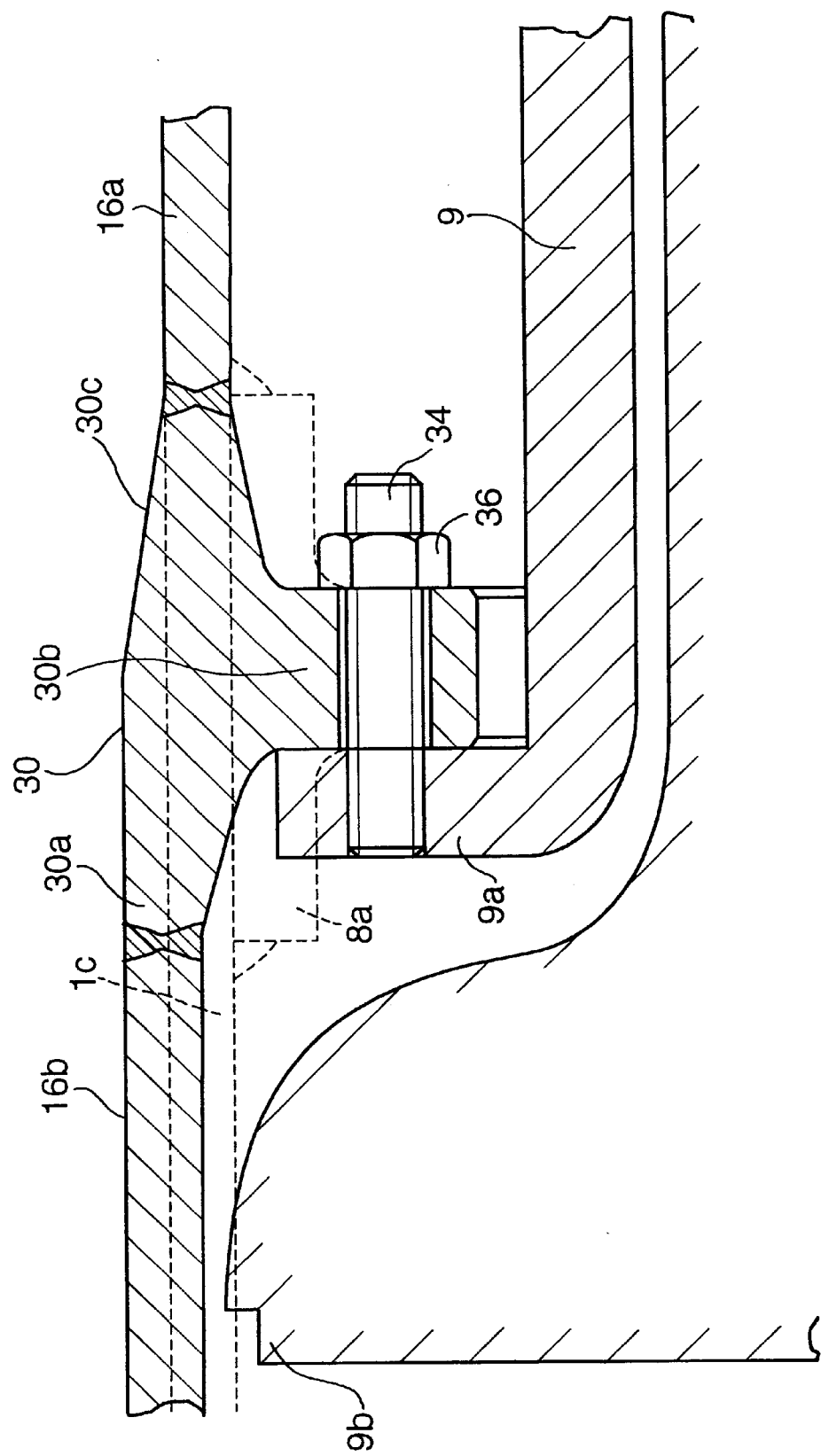
FIG. 2 is a cross-sectional view showing structural differences between a part of the multi-piece rim type disk wheel of the present invention and a part of a conventional structure of a multi-piece rim type disk wheel.
Figure 3A:
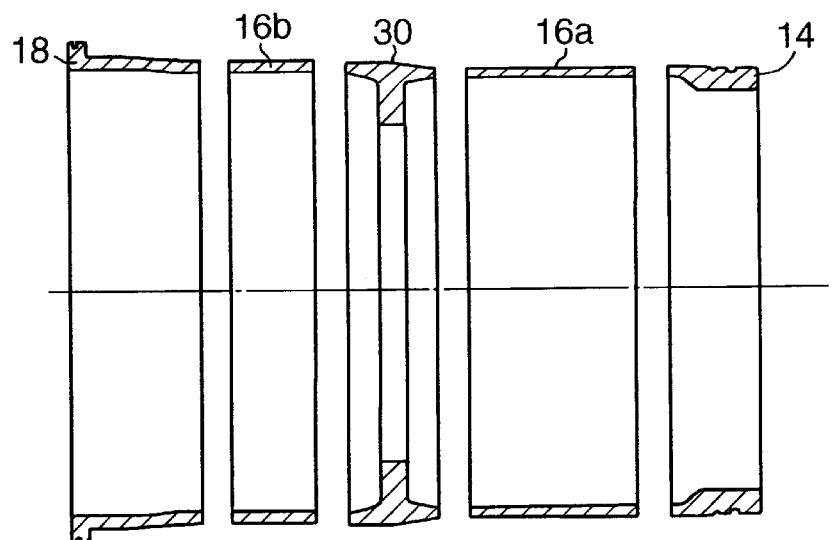
Figure 3B:
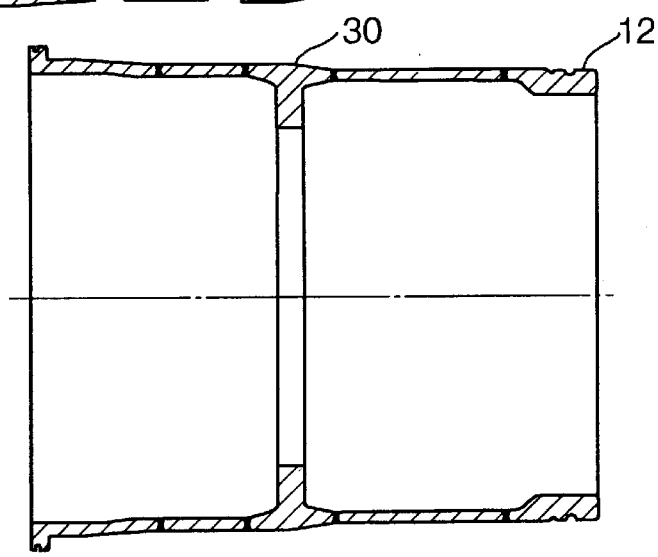
Figure 3C:
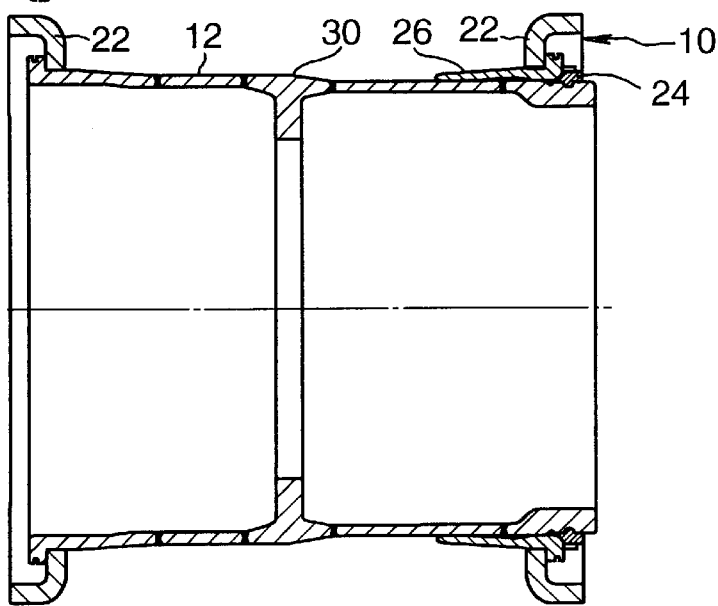
Figure 4A:
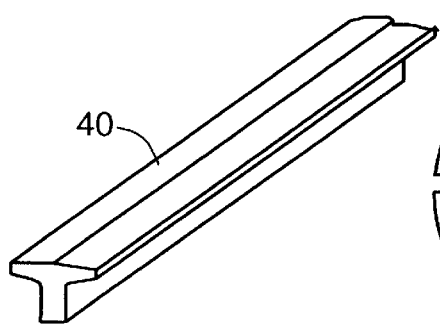
Figure 4B:
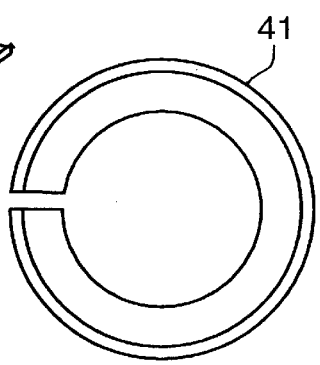
Figure 4C:
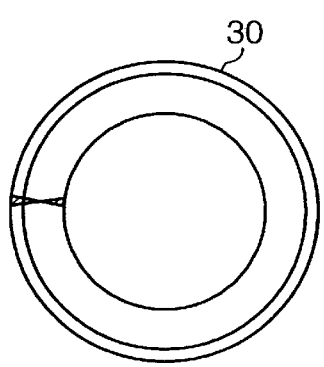
Figure 5A:
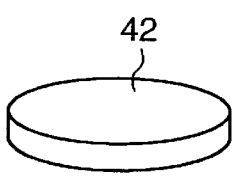
Figure 5B:
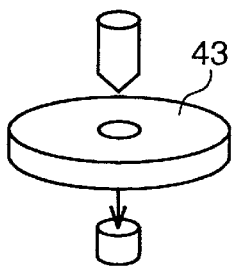
Figure 5C:
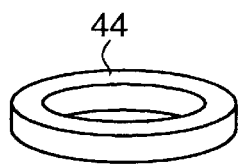
Figure 5D:
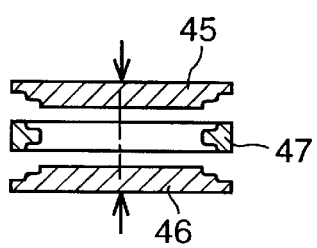
Figure 5E:
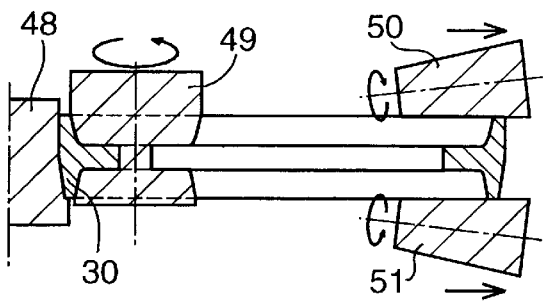
Figure 6:
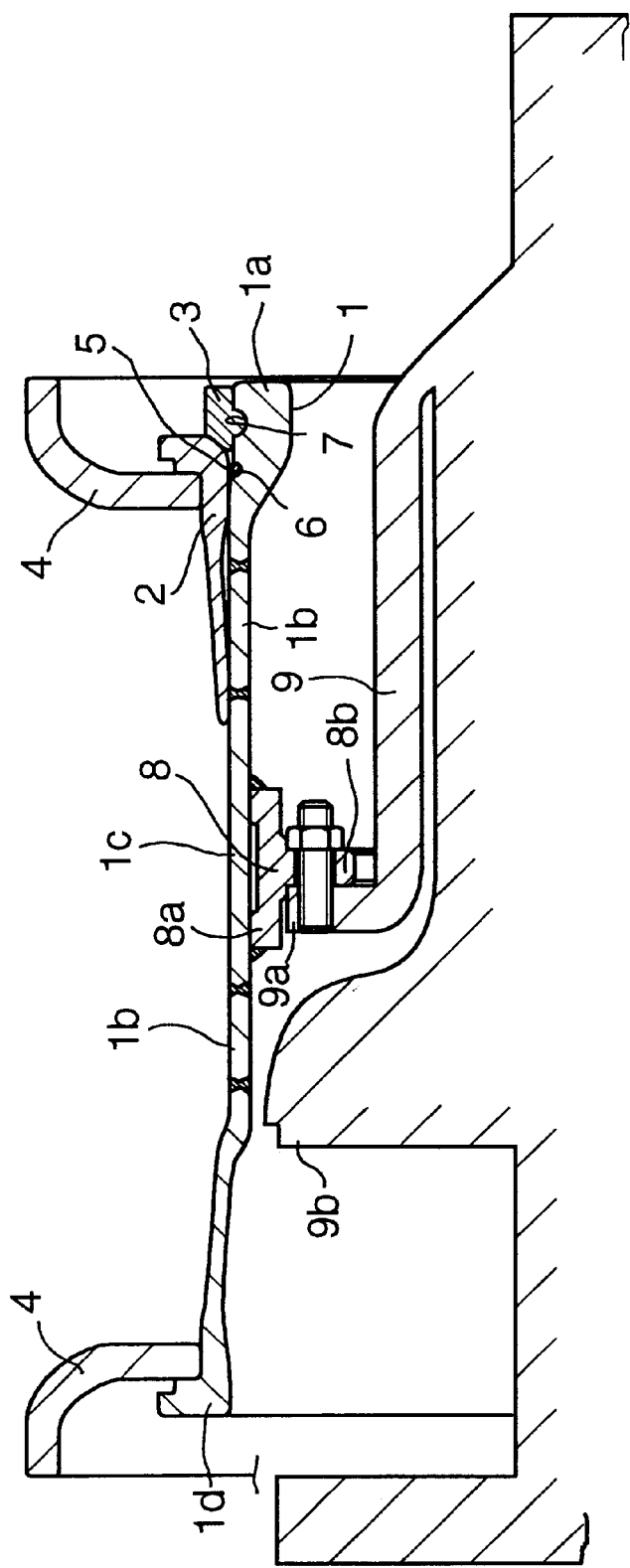

FIG. 3a is a cross-sectional view of the multi-piece rim type disk wheel at a step in a production method where members of a rim are separately manufactured according to an embodiment of the present invention, FIG. 3b is a cross-sectional view of the multi-piece rim type disk wheel at a step in a production method where the members of the rim are welded according to the embodiment of the present invention.;

FIG. 3c is a cross-sectional view of the multi-piece rim type disk wheel at a step in a production method where a multi-piece rim type disk wheel is assembled according to the embodiment of the present invention;

FIG. 4a is a perspective view of a disk at a step in a production method in a case where the disk of the multi-piece rim type disk wheel is produced by rolling a straight steel material according to the embodiment of the present invention;

FIGS. 4b–4c are front views of a disk at a step in a production method where the disk of the multi-piece rim type disk wheel produced by rolling as shown in FIG. 4a is rounded and butt-welded at ends according to the embodiment of the present invention;

FIGS. 5a–5c are perspective views of a disk at steps in a production method in a case where the disk of the multi-piece rim type disk wheel is produced by forging according to the embodiment of the present invention, FIGS. 5d–5e are top views of a disk at steps in a production method in a case where the disk of the multi-piece rim type disk wheel is produced by forging according to the embodiment of the present invention; and FIG. 6 is a cross-sectional view of a conventional multi-piece rim type disk wheel.

DETAILED DESCRIPTION OF THE PREFERRED EMBODIMENTS

A multi-piece rim type disk wheel and a method for producing the same according to an embodiment of the present invention will be explained with reference to FIGS. 1–5.

The multi-piece rim type disk wheel of the present invention includes a multi-piece rim 10 and a disk 30.

The multi-piece rim 10 includes a rim base 12 a flange 22, a lock ring 24 and a bead seat band 26, which are separate from each other and are constructed integrally with each other to form the multi-piece rim 10.

The disk 30, which is annular, includes an outside portion 30a constituting a part of the rim base 12 and having substantially the same diameter as those of a first and a second center bands 16a and 16b, and a hub coupling portion 30b extending radially inwardly from the outside portion 30a. The disk 30 has a substantially T-shaped cross-section.

The rim base 12 includes a gutter band 14, the first center band 16a the disk 30, the second center band 16b and a back flange 18, which have been manufactured separately from each other. The gutter band 14, the first center band 16a, the disk 30, the second center band 16b and the back flange 18 are arranged in that order in the axial direction, and are constructed integrally with each other by a weld into the integral rim base 12. The weld is a full penetration butt weld, which increases strength and reliability of a wheel. Lengths of the first center band 16a and the second center band 16b are determined depending on a rim width.

A lock ring groove 14a engaging the lock ring 24 for locking the bead seat band 26 in an axial direction of the wheel, and an O ring groove 14b engaging an O ring 28 for achieving an air-tight are formed in the gutter band 14.

The disk 30 is located between the first center band 16a and the second center band 16b. The outside portion 30a of the disk 30 constitutes a part of a center portion of the rim base 12. The hub coupling portion 30b of the disk 30 extends radially inwardly from an axially center portion of the outside portion 30a and is used for coupling the wheel to a hub 9 of an axle shaft. The wheel is coupled to the wheel coupling portion 9a of the hub 9 of the axle shaft by a hub bolt 34 and a hub nut 36 at the hub coupling portion 30b of the disk 30.

The outside portion 30a of the disk includes, first center band side portion located closer to the first center band 16a. i.e., a gutter band 14 side than an axial center of the hub coupling portion 30b. An outside surface 30c of the first center band side portion is inclined radially inwardly toward the first center band 16a which provides a smooth transition from the disk to the first center band 16a, and enables easy mounting and demounting of a tire.

The bead seat band 26 cooperates with the O ring 28 to prevent air from leaking out of the wheel and to prevent the lock ring 24 from jumping out of the wheel. The flanges 22 are disposed on the back flange 18 and on the bead seat band 26, respectively, to restrict the tire in the width direction. The width W of the flange 22 is greater than the height H of the flange 22 thereby to prevent the tire from being cut due to contact between axially outside ends 22a and the tire. On the contrary, in the conventional multi-piece rim type disk wheel, the width of a flange is smaller than the height of the flange, which might cause cut the tire.

In the multi-piece rim type disk wheel according to the embodiment of the present invention, since the outside portion 30a of the disk 30 constitutes a part of the rim base 12, a relatively large space is provided inside the multi-piece rim type disk wheel. With the conventional structures', as shown by the broken line in FIG. 2, if the diameter of the hub 9 is increased, the conventional wheel might interfere with a wheel coupling portion 9a of the hub 9 of an axle shaft and a break drum 9b. On the contrary, in the present invention, the disk 30 and the rim base 12 do not interfere with the hub 9 and the break drum 98b, even if the diameter of the wheel coupling portion 9a of the hub 9 of the axle shaft is increased, which makes it possible to increase a movable load of a vehicle and to reduce the weight of the multi-piece rim type disk wheel.

In a production method of the multi-piece rim type disk wheel according to the embodiment of the present invention, as illustrated in FIGS. 3a–3c, the disk 30, which includes the outside portion 30a constituting a part of the rim base 12 and the hub coupling portion 30b extending radially outwardly from the outside portion 30a, and has a substantially T-shaped cross-section is manufactured. The gutter band 14, the first center band 16a, the second center band 16b and the back flange 18 are separately manufactured as shown in FIG.

3a. Each of the disk 30, the first center band 16a, the second center band 16b and the back flange 18 is manufactured by, for example, rolling a steel plate having a final cross-sectional configuration and extending straight in a longitudinal direction, rounding and butt-welding opposite ends of the rounded plate, respectively.

Then, the gutter band 14, the first center band 16a, the disk 30 having a substantially T-shaped cross-section, the second center band 16b and the back flange 18, which have been manufactured separately from each other, are arranged in that order in the axial direction of the rim base and are welded with each other by a full penetration butt weld into the integral rim base 12 as shown in FIG. 3b.

Then, the rim base 12 having the disk 30 formed therein, the bead seat band 26, the lock ring 24 and the flange 22, which are separate from each other are assembled into the multi-piece rim type disk wheel as shown in FIG. 3c.

When producing in relatively large quantities, as illustrated in FIGS. 4a 4c, it is preferable that the disk 30 is manufactured by hot-rolling a straight steel material 40 having a T-shaped cross-section as shown in FIG. 4a, rounding it into a material 41 as shown in FIG. 4b, and butt-welding opposite ends of the material 41 to produce a ring-shaped disk as shown in FIG. 4c. Further, when the production quantity is not so large, as illustrated in FIGS. 5a–5e, it is preferable from an economical standpoint that the disk 30 is manufactured by forging which may include roll forging. FIGS. 5a–5c illustrate a case of roll forging. More particularly, a center portion of a circular plate material 42 shown in FIG. 5a is punched into a ring-shaped material 4 as shown in FIG. 5b, and then, the ring-shaped material 43 is roll-forged into a ring-shaped material 44 as shown in FIG. 5c. Then, the ring-shaped material 44 is forged using upper and lower dies 45 and 46 to form a ring 47 having an intermediate T-shaped cross-section as shown in FIG. 5d. The ring 47 is forged in its thickness direction between a mandrel 49 and a fixed die 48 and forged in its height direction by upper and lower rolls 50 and 51 into the disk 30 as shown in FIG. 5c.

According to the present invention, the following technical advantages are obtained:

First, in the multi-piece rim type disk wheel, since the outside portion of the disk constitutes a part of the rim base, a relatively large space is provided inside the multi-piece rim type disk wheel, which allows for an increase in the outside diameters of the hub and the axle shaft. As a result, it becomes possible to carry an increased movable load, and to reduce the weight of the multi-piece rim type disk wheel.

Second, in the multi-piece rim type disk wheel, since the first and the second center bands, the gutter band and the back flange are manufactured separately from each other and are connected to each other into the integral rim base, the production of each member is easy.

Third, in the multi-piece rim type disk wheel, since the opposite ends of the outside portion of the disk are connected to the first and the second center bands, respectively, by a full penetration butt weld rather than by a fillet weld, a higher strength and greater reliability can be obtained.

Fourth, in the multi-piece rim type disk wheel, since the outside surface of the first center band side portion located closer to the first center band than the axial center of the hub coupling portion is inclined radially inwardly toward the gutter band, the transition of the cross-sectional configurations among members constituting the rim base is smooth, which makes mounting and demounting of a tire easy.

Fifth, in the production method of the multi-piece rim type disk wheel, since the disk, the gutter band, the first center band, the second center band and the back flange are manufactured separately from each other, and then are connected to each other by a full penetration butt weld into the integral rim base, production of each member of the rim base is easy.

Although the present invention has been described with reference to specific exemplary embodiments, it will be appreciated in the art that various modifications and alterations can be made to the particular embodiments shown, without materially departing from the novel teachings and advantages of the present invention. Accordingly, it is to be understood that all such modifications and alterations are included within the spirit and scope of the present invention as defined by the following claims.

What is claimed is:

1. A multi-piece rim type disk wheel comprising:

a multi-piece rim including a rim base, a bead seat band, a lock ring and a flange which are formed separately from each other; and a disk, wherein said disk has a substantially T-shaped cross-section, and includes an outside portion constituting a part of said rim base, and a hub coupling portion extending radially inwardly from said outside portion, wherein said outside portion of said disk includes a first center band side portion located closer to said first center band than an axial center of said hub coupling portion, said first center band side portion including an outside surface which is inclined radially inwardly toward said first center band.

2. A method of producing a multi-piece rim type disk wheel which includes a multi-piece rim including a rim base, a bead seat band, a lock ring and a flange, and a disk, said method comprising:

manufacturing said disk having a substantially T-shaped cross-section, said disk including an outside portion constituting a part of said rim base and a hub coupling portion extending radially inwardly from said outside portion, and manufacturing a gutter band, a first center band, a second center band and a back flange separately from each other;

arranging said gutter band, said first center band, said disk of the substantially T-shaped cross-section, said second center band and said back flange in that order in an axial direction of the rim base, and connecting said gutter band, said first center band, said disk, said second band and said back flange with each other by a weld to construct said rim base; and assembling said rim base integrally formed with said disk, said bead seat band, said lock ring and said flange, which are separate from each other, into a multi-piece rim type disk wheel, wherein said outside portion of said disk includes a first center band side portion located closer to said first center band than an axial center of said hub coupling portion, said first center band side portion including an outside surface which is inclined radially inwardly toward said first center band.

3. A multi-piece rim type disk wheel comprising:

a multi-piece rim including a rim base, a bead seat band, a lock ring and a flange which are formed separately from each other; and a disk, wherein said disk has a substantially T-shaped cross-section, and includes an outside portion constituting a part of said rim base, and a hub coupling portion extending radially inwardly from said outside portion, said outside portion of said disk including two opposite axial ends, wherein said rim base is constructed of a plurality of members including a gutter band, a first center band, said disk, a second center band and a back flange constructed separately from each other, which are arranged in that order in an axial direction of the rim base, and are connected to each other by a weld, wherein said outside portion of said disk includes a first center band side portion located closer to said first center band than an axial center of said hub coupling portion, said first center band side portion including an outside surface which is inclined radially inwardly toward said first center band.

4. A multi-piece rim type disk wheel according to claim 3, wherein one end of the two opposite axial ends of said outside portion of said disk is connected to said first center band by a full penetration butt weld, and another end of the two opposite axial ends of said outside portion of said disk is connected to said second center band by a full penetration butt weld.

5. A multi-piece rim type disk wheel according to claim 1, wherein said rim base is constructed of a plurality of members including a gutter band, a first center band, said disk, a second center band and a back flange constructed separately from each other, which are arranged in that order in an axial direction of the rim base and are connected with each other by a weld; and wherein said outside portion of said disk includes two opposite axial ends, one end of the two opposite axial ends of said outside portion being connected to said first center band by a full penetration butt weld, and another end of the two opposite axial ends of said outside portion being connected to said second center band by a full penetration butt weld.

* * * * *